(12) United States Patent
Eason et al.

(10) Patent No.: US 7,214,247 B2
(45) Date of Patent: May 8, 2007

(54) POLYMERS FOR LAUNDRY CLEANING COMPOSITIONS

(75) Inventors: Michael Douglas Eason, Merseyside (GB); Ezat Khoshdel, Merseyside (GB); Susanne Henning Rogers, Merseyside (GB); Michael Stephen White, Merseyside (GB)

(73) Assignee: Unilever Home & Personal Care USA, Division of Conopco, Inc., Greenwich, CT (US)

( * ) Notice: Subject to any disclaimer, the term of this patent is extended or adjusted under 35 U.S.C. 154(b) by 338 days.

(21) Appl. No.: 10/323,402

(22) Filed: Dec. 19, 2002

(65) Prior Publication Data

US 2003/0130160 A1 Jul. 10, 2003

(30) Foreign Application Priority Data

Dec. 20, 2001 (GB) .................................. 0130499.7

(51) Int. Cl.
*D06L 1/00* (2006.01)
*D06M 15/00* (2006.01)
*C11D 3/37* (2006.01)

(52) U.S. Cl. ............................ 8/137; 8/181; 510/360; 510/475; 510/499

(58) Field of Classification Search .................... 8/181, 8/137; 510/360, 475, 499
See application file for complete search history.

(56) References Cited

U.S. PATENT DOCUMENTS

| 3,776,983 | A | 12/1973 | Iovine et al. ............... 260/901 |
| 4,029,720 | A | 6/1977 | Seiler et al. ................ 260/887 |
| 4,740,546 | A | 4/1988 | Masuda et al. ............. 524/315 |
| 4,909,324 | A | 3/1990 | Shu ............................ 166/275 |
| 5,273,676 | A | 12/1993 | Boeckh et al. ......... 252/174.21 |
| 5,391,628 | A | 2/1995 | Gaillard et al. ............. 525/250 |
| 5,431,846 | A | 7/1995 | Christopher et al. ... 252/174.24 |
| 5,484,851 | A | 1/1996 | Fock ........................ 525/333.5 |
| 5,665,827 | A | 9/1997 | Hall ............................ 525/280 |
| 6,235,813 | B1 | 5/2001 | Brandt et al. ................ 523/436 |
| 6,248,839 | B1 | 6/2001 | Esselborn et al. .......... 525/329 |
| 6,573,234 | B1* | 6/2003 | Sivik et al. .................. 510/475 |

FOREIGN PATENT DOCUMENTS

| DE | 31 31 848 | 2/1983 |
| DE | 36 36 429 | 8/1987 |
| EP | 705 900 | 4/1996 |
| EP | 705900 | * 4/1996 |
| GB | 1 512 280 | 5/1978 |
| GB | 2 168 989 | 7/1986 |
| WO | 97/42285 | 11/1997 |
| WO | 00/71591 | 11/2000 |
| WO | 00/71660 | 11/2000 |
| WO | WO 00/71591 | * 11/2000 |

OTHER PUBLICATIONS

GB Search Report in a GB application: GB 0130499.7, Jun. 26, 2002.
Japanese Abstract JP 58 029830 published Feb. 22, 1983.
PCT International Search Report in a PCT application PCT/EP 02/13735.
Derwent Abstract of DE 36 36 429—published Aug. 27, 1987.
Derwent Abstract of DE 31 31 848—published Feb. 24, 1983.

* cited by examiner

*Primary Examiner*—Brian Mruk
(74) *Attorney, Agent, or Firm*—Rimma Mitelman

(57) ABSTRACT

The present invention relates to the use of polymers comprising a block copolymer containing at least one group A and at least one group B in which each group A is a polymeric block built up from an ethylenically unsaturated polymerisable monomer and each group B is a polymeric block built up from an alkylene oxide, alkylene glycol or cyclic ether monomer or a mixture thereof for promoting soil release during laundering of a textile fabric and processes for their preparation. Laundry cleaning compositions comprising such polymers, a method of promoting soil release during laundering of a textile fabric and the use of such polymers in the manufacture of a laundry cleaning composition for effecting soil release from a laundry item form other aspects of the invention.

15 Claims, No Drawings

POLYMERS FOR LAUNDRY CLEANING COMPOSITIONS

TECHNICAL FIELD

The present invention relates to block copolymers which are used in laundry cleaning products, for instance, for incorporation in products for dosing in the wash and/or rinse, and processes for their preparation. These polymers are intended for, but not limited to, soil release benefits in such products.

BACKGROUND OF THE INVENTION

The term "soil release polymer" is used in the art to cover polymeric materials which assist release of soil from fabrics, e.g. cotton or polyester based fabrics. For example, it is used in relation to polymers which assist release of soil direct from fibres. It is also used to refer to polymers which modify the fibres so that dirt adheres to the polymer-modified fibres rather than to the fibre material itself. Then, when the fabric is washed the next time, the dirt is more easily removed than if it was adhering the fibres. Although not wishing to be bound by any particular theory or explanation, the inventors believe that the soil release polymers utilised in the present invention probably exert their effect mainly by the latter mechanism.

The compounds utilised by the present invention have been found, dependent upon the structure of the compound in question, to deliver a soil release, fabric care and/or other laundry cleaning benefit.

The deposition of a benefit agent onto a substrate, such as a fabric, is well known in the art. In laundry applications typical "benefit agents" include fabric softeners and conditioners, soil release polymers, sunscreens; and the like. Deposition of a benefit agent is used, for example, in fabric treatment processes such as fabric softening to impart desirable properties to the fabric substrate.

Conventionally, the deposition of the benefit agent has had to rely upon the attractive forces between the oppositely charged substrate and the benefit agent. Typically this requires the addition of benefit agents during the rinsing step of a treatment process so as to avoid adverse effects from other charged chemical species present in the treatment compositions. For example, cationic fabric conditioners are incompatible with anionic surfactants in laundry washing compositions.

Such adverse charge considerations can place severe limitations upon the inclusion of benefit agents in compositions where an active component thereof is of an opposite charge to that of the benefit agent. For example, cotton is negatively charged and thus requires a positively charged benefit agent in order for the benefit agent to be substantive to the cotton, i.e. to have an affinity for the cotton so as to absorb onto it. Often the substantivity of the benefit agent is reduced and/or the deposition rate of the material is reduced because of the presence of incompatible charged species in the compositions.

WO-A-97/42285 discloses cotton soil-release polymers comprising a polyamine backbone and quaternary ammonium cationic groups. However, the present applicants have found that, whilst cationic groups give good substantivity to cotton, a high density of cationic positive changes on the polymer gives rise to staining of the fabric.

Thus, there remains a need to obtain soil release in laundry products based on soil-release agents which give better substantivity to cotton and therefore better soil release from cotton fabrics, fewer or no detrimental interactions with LAS or other anionic surfactants, as well as less staining negatives.

DEFINITION OF THE INVENTION

In a first aspect, the present invention provides the use of a polymer comprising a block copolymer containing at least one group A and at least one group B in which each group A is a polymeric block built up from an ethylenically unsaturated polymerisable monomer and each group B is a polymeric block built up from an alkylene oxide, alkylene glycol or cyclic ether monomer or a mixture thereof for promoting soil release during the laundering of a textile fabric.

This aspect of the present invention may also be expressed as a method of promoting soil release during laundering of a textile fabric, the method comprising contacting the fabric with a polymer as defined above or a composition as defined above and subsequently washing the fabric after wear or use of the fabric.

In a second aspect, the present invention provides a laundry cleaning composition which comprises a block copolymer containing at least one group A and at least one group B in which each group A is a polymeric block built up from an ethylenically unsaturated polymerisable monomer selected from vinylformamide, vinylimidazoles and compounds of the general formula.

$$H_2C=C(R)-CO-R^1 \quad (I)$$

where R is a hydrogen atom or a methyl group; and
$R^1$ is a group of formula $-O-(CHR^2)_n-NR^3R^4$ or $-NR^5R^6$ in which n is 1, 2 or 3, $R^2$ represents a hydrogen atom or a hydroxyl or alkyl group, $R^3$ and $R^4$ each independently represent a hydrogen atom or an optionally substituted alkyl group or $R^3$ and $R^4$ together with the interjacent nitrogen atom represent a heterocyclic group, and $R^5$ and $R^6$ each independently represent a hydrogen atom or an optionally substituted alkyl group or $R^5$ and $R^6$ together with the interjacent nitrogen atom represent a heterocyclic group; and each group B is a polymeric block built up from an alkylene oxide, alkylene glycol or cyclic ether monomer or a mixture thereof.

In addition, this aspect is directed to a laundry cleaning composition which comprises which comprises a block copolymer containing at least one group A and at least one group B and an anionic surfactant;

in which each group A is a polymeric block built up from an ethylenically unsaturated polymerisable monomer selected from vinylformamide, vinylpyridines, vinylimidazoles and compounds of the general formula.

$$H_2C=C(R)-CO-R^1 \quad (I)$$

where R is a hydrogen atom or a methyl group; and
$R^1$ is a group of formula $-O-(CHR^2)_n-NR^3R^4$ or $-NR^5R^6$ in which n is 1, 2 or 3, $R^2$ represents a hydrogen atom or a hydroxyl or alkyl group, $R^3$ and $R^4$ each independently represent a hydrogen atom or an optionally substituted alkyl group or $R^3$ and $R^4$ together with the interjacent nitrogen atom represent a heterocyclic group, and $R^5$ and $R^6$ each independently represent a hydrogen atom or an optionally substituted alkyl group or $R^5$ and $R^6$ together with the interjacent nitrogen atom represent a heterocyclic group; and each group B is a polymeric block built up from an alkylene oxide, alkylene glycol or cyclic ether monomer or a mixture thereof.

In a third aspect, the present invention a polymer which comprises a block copolymer containing at least one group A and at least one group B in which each group A is a polymeric block built up from an ethylenically unsaturated polymerisable monomer selected from vinylformamide, vinylimidazoles and compounds of the general formula.

$$H_2C=C(R)-CO-R^1 \quad (I)$$

where R is a hydrogen atom or a methyl group; and
$R^1$ is a group of formula $-O-(CHR^2)_n-NR^3R^4$ or $-NR^5R^6$ in which n is 1, 2 or 3, $R^2$ represents a hydrogen atom or a hydroxyl or alkyl group, $R^3$ and $R^4$ each independently represent a hydrogen atom or an optionally substituted alkyl group or $R^3$ and $R^4$ together with the interjacent nitrogen atom represent a heterocyclic group, and $R^5$ represents an optionally substituted alkyl group or $R^5$ and $R^6$ together with the interjacent nitrogen atom represents a heterocyclic group and $R^6$ represents hydrogen or a group independently selected from those defined for $R^5$; and
each group B is a polymeric block built up from an alkylene oxide, alkylene glycol or cyclic ether monomer or a mixture thereof.

In a fourth aspect, the present invention provides a process for the preparation of a polymer as defined above which comprises forming a poly(alkylene oxide) or poly (alkylene glycol) macroinitiator which comprises a poly (alkylene oxide) or a poly(alkylene glycol) end-capped with one or more groups which are capable of acting as radical initiators and reacting the macroinitiator with one or more ethylenically unsaturated polymerisable monomers.

DETAILED DESCRIPTION OF THE INVENTION

Definitions

Any alkyl or alkenyl group, unless otherwise specified, may be linear or branched and may contain up to 12, preferably up to 6, and especially up to 4 carbon atoms. Preferred alkyl groups are methyl, ethyl, propyl and butyl. Preferred alkenyl groups include ethenyl (vinyl), propenyl and butenyl groups. When an alkyl moiety forms part of another group, for example the alkyl moiety of an aralkyl group, it is preferred that it contains up to 6, especially up to 4, carbon atoms. Preferred alkyl moieties are methyl and ethyl.

An aryl group may be any monocyclic or polycyclic aromatic hydrocarbon group and may contain from 6 to 14, especially 6 to 10, carbon atoms. Preferred aryl groups include phenyl, naphthyl, anthryl and phenanthryl groups, especially a phenyl or naphthyl, and particularly a phenyl, group. When an aryl moiety forms part of another group, for example the aryl moiety of an aralkyl group, it is preferred that it is a phenyl, naphthyl, anthryl or phenanthryl, especially phenyl or naphthyl, and particularly a phenyl, moiety.

An aralkyl group may be any alkyl group substituted by an aryl group. A preferred aralkyl group contains from 7 to 20, especially 7 to 16, carbon atoms, particularly preferred aralkyl groups being benzyl, naphthylmethyl, anthrylmethyl and phenanthrylmethyl groups. A particularly preferred aralkyl group is a benzyl group.

A heteroaryl group may be any aromatic monocyclic or polycyclic ring system which contains at least one heteroatom. Preferably, a heteroaryl group is a 5- to 14-membered, particularly a 5- to 10-membered, and especially a 5- to 6-membered, aromatic ring system containing at least one heteroatom selected from oxygen, sulphur and nitrogen atoms. Preferred heteroaryl groups include pyridyl, pyrylium, thiopyrylium, pyrrolyl, furyl, thienyl, indolinyl, isoindolinyl, indolizinyl, imidazolyl, pyridonyl, pyronyl, pyrimidinyl, pyrazinyl, oxazolyl, thiazolyl, purinyl, quinolinyl, isoquinolinyl, quinoxalinyl, pyridazinyl, benzofuranyl, benzoxazolyl and acridinyl groups.

A heterocyclic group may be any monocyclic or polycyclic ring system which contains at least one heteroatom and may be unsaturated or partially or fully saturated. The term "heterocyclic" thus includes heteroaryl groups as defined above as well as non-aromatic heterocyclic groups. Preferably, a heterocyclic group is a 3- to 14-membered, particularly a 3- to 10-membered, especially a 5- to 6-membered, ring system containing at least one heteroatom selected from oxygen, sulphur and nitrogen atoms. Preferred heterocyclic groups include the specific heteroaryl groups named above as well as pyranyl, piperidinyl, pyrrolidinyl, imidazolidinyl, dioxanyl, piperazinyl, morpholinyl, thiomorpholinyl, morpholinosulphonyl, tetrahydroisoquinolinyl and tetrahydrofuranyl groups.

When any of the foregoing substituents are designated as being optionally substituted, the substituent groups which are optionally present may be any one or more of those customarily employed in the development of compounds for laundry treatment and/or the modification of such compounds to influence their structure/activity, stability or other property. Specific examples of such substituents include, for example, halogen atoms, nitro, cyano, hydroxyl, alkyl, haloalkyl, alkoxy, haloalkoxy, amino, alkylamino, dialkylamino, formyl, alkoxycarbonyl, carboxyl, alkanoyl, alkylthio, alkylsulphinyl or alkylsulphonyl groups. When any of the foregoing substituents represents or contains an alkyl substituent group, this may be linear or branched and may contain up to 12, preferably up to 6, and especially up to 4, carbon atoms. A halogen atom may be a fluorine, chlorine, bromine or iodine atom and any group which contains a halo moiety, such as a haloalkyl group, may thus contain any one or more of these halogen atoms. The terms "poly(alkylene oxide)" and "poly(alkylene glycol)" are alternative names for polymers having the same chemical structure. The only distinction is that the former term is frequently used for higher molecular weight materials and the latter for lower molecular weight materials. These forms may be used interchangeably in the present specification.

The use of the polymers for promoting soil release during laundering of a textile fabric involves the broadest definition of the polymers and relates to the use of a polymer comprising a block copolymer containing at least one group A and at least one group B in which each group A is a polymeric block built up from an ethylenically unsaturated polymerisable monomer and each group B is a polymeric block built up from an alkylene oxide, alkylene glycol or cyclic ether monomer or a mixture thereof for promoting soil release during the laundering of a textile fabric.

The laundry compositions comprising the polymer defined above exclude vinylpyridine residues or include vinylpyridine residues with an anionic surfactant. The polymer per se as also defined above excludes vinylpyridine residues and acrylamide residues. It will, however, be appreciated that vinylpyridine and/or acrylamide residues may be present in addition to the polymers as defined above.

The Polymers

The polymers of the present invention are block copolymers which comprise at least one polymeric block A and at least one polymeric block B. Thus, in their simplest form, the polymers of the present invention have the formula A-B.

Preferably, the polymers of the invention are or comprise ABA block copolymers. The polymers of the invention may simply be the ABA block copolymers or they may comprise the ABA block copolymers, with further modification such as, for example, by grafting onto the ABA block copolymer or by further reaction of the ABA block copolymer.

The ABA block copolymers of the invention are obtainable by bonding each end of a B block to an A block. The B block may be linear, branched or hyperbranched and is preferably linear. If the B block is branched or hyperbranched, the block copolymer may comprise two or more B blocks, i.e., it may have the general formula $B(A)_m$, where m is an integer of two or more, preferably from 2 to 6. Polymers of this type are, therefore, encompassed by the term ABA block copolymers as used herein.

Each A block may be bonded to the B block at the same time or each A block may be bonded to the B block in separate reaction steps. A blocks may be bonded directly to B blocks, where the chemistry of the A and B blocks permits this. Alternatively, the A blocks may be bonded to the B blocks via a suitable linker group L, so that the ABA block copolymer is of the formula A-L-B-L-A or, where the B block is branched or hyper branched, $B(-L-A)_m$. Polymers of formula A-L-B-L-A and $B(-L-A)_m$ fall within the meaning of the term ABA block copolymer, as used herein. Typically, L is a divalent group having a molecular weight of from 14 to 200 Daltons which links the A and B blocks, preferably via O—C, N—C or S—C bonds to the B block. Preferably L is selected from:

—R'—C(O)—O—;

—R'—O—C(O)—O—;

—R'—C(O)—N(R")—;

—R'—O—C(O)—N(R")—; or

—R'—N(R")—C(O)—N(R'")—;

in which R' is a divalent, optionally substituted, linear or branched $C_1$–$C_{18}$ hydrocarbon radical (such as $C_1$–$C_{12}$ alkylene), and R" and R'" are independently selected from monovalent, optionally substituted, linear or branched $C_{1-18}$ hydrocarbon radicals e.g., $C_1$–$C_{18}$ alkyl, such as methyl.

Preferably, the divalent linker group is a carbonylalkylene group containing from 2 to 7 carbon atoms which forms an ester linkage to the B block, such as, for example, a group of formula —C(O)—C(CH$_3$)$_2$—.

Examples of monovalent, unsubstituted radicals are alkyl radicals, such as the methyl, ethyl, n-propyl, iso-propyl, n-butyl, iso-butyl, tert-butyl, n-pentyl, iso-pentyl, neo-pentyl and tert-pentyl radical; alkoxy radicals, such as the methoxy, ethoxy, n-propoxy, iso-propoxy, n-butoxy, iso-butoxy, tert-butoxy, n-pentoxy, iso-pentoxy, neo-pentoxy and tert-pentoxy radicals; hexyl radicals, such as the n-hexyl radical; alkenyl radicals, such as the vinyl, allyl, 5-hexenyl, 4-vinylcyclohexyl and the 3-norbornenyl radical; cycloalkyl radicals, such as cyclopentyl, cyclohexyl, 4-ethylcyclohexyl and cycloheptyl radical; norbornyl radicals and methylcyclohexyl radicals; aryl radicals, such as the phenyl, biphenylyl, napthyl, anthryl and phenanthryl radical; alkaryl radicals, such as o-, m- and p-tolyl radical, xylyl radicals and ethylphenyl radical; and aralkyl radicals, such as the benzyl, styryl, and phenylethyl radicals.

Examples of monovalent, substituted radicals are halogenated hydrocarbon radicals, such as the chloromethyl, 3-chloropropyl, 3-bromopropyl, 3,3,3-trifluoropropyl and 5,5,5,4,4,3,3-heptafluoropentyl radical and the chlorophenyl, dichlorophenyl and trifluorotolyl radical; mercaptoalkyl radicals, such as the 2-mercaptoethyl and 3-mercaptopropyl radical; cyanoalkyl radicals, such as the 2-cyanoethyl and 3-cyanopropyl radical; aminoalkyl radicals, such as the 3-aminopropyl, N-(2-aminoethyl)-3-aminopropyl and N-(2-aminoethyl)-3-amino-(2-methyl)propyl radical; aminoaryl radicals, such as the aminophenyl radical; acyloxyalkyl radicals, such as the 3-acryloxypropyl and 3-methacryloxypropyl radical; and hydroxyalkyl radicals, such as the hydroxypropyl radical.

Preferred monovalent radicals are independently selected from unsubstituted or substituted $C_1$ to $C_6$ alkyl radicals or optionally substituted phenyl radicals, in particular methyl, ethyl, propyl or phenyl radicals.

Examples of divalent hydrocarbon radicals are linear or branched saturated alkylene radicals, such as the methylene and ethylene radical, as well as propylene, butylene, pentylene, hexylene, cyclohexylene and octadecylene radicals; alkoxyalkylene radicals such as the methoxyethylene and ethoxyethylene radical; unsaturated alkylene or arylene radicals, such as the hexenylene radical and phenylene radicals; alkarylene radicals such as the methylphenylene and ethylphenylene radical, and alkoxyarylene radicals such as the methoxyphenylene and ethoxyphenylene radical. The divalent hydrocarbon radical $R^7$ and $R^8$ can be interrupted by divalent radicals, bonded to carbon atoms on both sides, such as —O—, —C(O)O—, —O(O)C—, —CONR$^9$—, —NR$^9$C(O)— and —C(O)—, where $R^9$ is hydrogen or a monovalent, optionally substituted, linear or branched $C_{1-18}$ hydrocarbon radical as described above.

The polymers of the invention may comprise ABA block copolymers having further polymer chains grafted onto the block copolymer. Suitable polymer chains for grafting onto the block copolymers include, for example, silicones, and polymers derived from monomers such as acrylate and methacrylate esters (eg, esters of acrylic or methacrylic acid With $C_1$–$C_8$ straight or branched chain alcohols), styrene (optionally substituted with one or more $C_1$–$C_{12}$ straight or branched chain alkyl groups) and mixtures thereof. The polymer chains which may be grafted onto the block copolymers may be hydrophobic or hydrophilic and hydrophobic, hydrophilic or mixtures of hydrophobic and hydrophilic chains may be grafted onto the block copolymers. Suitable hydrophobic and hydrophilic macromers for the grafts are described in WO 95/06078.

The A Blocks

The A blocks in the copolymers of the invention are of a polymer that is derived from an ethylenically unsaturated polymerisable monomer.

By "polymerisable" is meant monomers that can be polymerised by reaction between the monomers to form an extended polymer chain which is typically linear.

By "ethylenically unsaturated" is meant monomers that contain at least one polymerisable carbon-carbon double bond (which can be mono-, di-, tri- or tetra- substituted). Either a single monomer or a combination of two or more monomers can be utilised. In either case, the monomers are selected to meet the physical and chemical requirements of the final ABA block copolymer.

The A blocks, which may be the same or different in each ABA block copolymer (but which are preferably the same) preferably have a molecular weight in the range of from 100 to 1,000,000 Daltons, more preferably from 1,000 to 500,000 Daltons, especially 1,000 to 100 000 Daltons.

Suitable ethylenically unsaturated monomers include those having the following general formula:

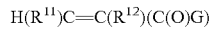

$H(R^{11})C=C(R^{12})(C(O)G)$ in which $R^{11}$ and $R^{12}$ are independently selected from hydrogen, $C_1–C_{10}$ straight or branched chain alkyl, methoxy, ethoxy, 2-hydroxyethoxy, 2-methoxyethyl and 2-ethoxyethyl groups;

G is selected from hydroxyl, $—O(M)_{2/v}$, $—OR^{13}$, $—NH_2$, $—NHR^{13}$ and $—N(R^{13})(R^{14})$;

where M is a counter-ion of valency v selected from metal ions such as alkali metal ions and alkaline earth metal ions, ammonium ions and substituted ammonium ions such as mono-, di-, tri- and tetraalkylammonium ions, and each $R^{13}$ and $R^{14}$ is independently selected from hydrogen, $C_1–C_{40}$ straight or branched chain alkyl, optionally substituted with one or more groups selected from hydroxy, amino, $C_1–C_3$ alkoxy, $C_1–C_3$ alkylamino and di($C_1–C_3$ alkyl)amino, for example N,N-dimethylaminoethyl, 2-hydroxyethyl, 2-methoxyethyl, and 2-ethoxyethyl. Representative non-limiting examples of monomers useful herein include protected or non-protected acrylic acid and methacrylic acid and salts, esters and amides thereof.

The salts can be derived from any of the common non-toxic metal, ammonium, or substituted ammonium counter ions. The esters can be derived from $C_{1-40}$ straight chain, $C_{3-40}$ branched chain, or $C_{3-40}$ carbocyclic alcohols, from polyhydric alcohols having from about 2 to about 8 carbon atoms and from about 2 to about 8 hydroxyl groups (non-limiting examples of which include ethylene glycol, propylene glycol, butylene glycol, hexylene glycol, glycerol, and 1,2,6-hexanetriol); from amino alcohols (non-limiting examples of which include aminoethanol, dimethylaminoethanol and diethylaminoethanol and their quaternised derivatives); or from alcohol ethers (non-limiting examples of which include methoxyethanol and ethoxyethanol).

The amides can be unsubstituted, N-alkyl or N-alkylamino mono-substituted, or N,N-dialkyl, or N,N-dialkylamino disubstituted, wherein the alkyl or alkylamino groups can be derived from $C_{1-40}$ straight chain, $C_{3-40}$ branched chain, or $C_{3-40}$ carbocyclic moieties. In addition, the alkylamino groups can be quaternised.

Also useful as monomers are protected and unprotected acrylic or/and methacrylic acids, salts, esters and amides thereof, wherein the substituents are on the two and three carbon position of the acrylic and/or methacrylic acids, and are independently selected from $C_{1-4}$ alkyl, hydroxyl, halide (—Cl, —Br, —F, —I), —CN, and —$CO_2H$, for example methacrylic acid, ethacrylic acid, alpha-chloroacrylic acid and 3-cyano acrylic acid. The salts, esters, and amides of these substituted acrylic and methacrylic acids can be defined as described above for the acrylic/methacrylic acid salts, esters and amides.

Other useful monomers include: vinyl formamide; vinyl and allyl esters of $C_{1-40}$ straight chain, $C_{3-40}$ branched chain, or $C_{3-40}$ carbocyclic carboxylic acids; vinyl and allyl halides (e.g. vinyl chloride, allyl chloride); pyridines substituted with one or more vinyl or allyl groups (e.g. vinyl pyridine, allyl pyridine); vinylimidazoles; vinylidene chloride; and hydrocarbons having at least one unsaturated carbon-carbon double bond (e.g. styrene, alpha-methylstyrene, t-butylstyrene, butadiene, isoprene, cyclohexadiene, ethylene, propylene, 1-butene, 2-butene, isobutylene, p-methylstyrene); and mixtures thereof.

Preferred monomers useful herein include those selected from protected and unprotected acrylic acid, methacrylic acid, ethacrylic acid, methyl acrylate, ethyl acrylate, n-butyl acrylate, iso-butyl acrylate, t-butyl acrylate, 2-ethylhexyl acrylate, decyl acrylate, octyl acrylate, methyl methacrylate, ethyl methacrylate, n-butyl methacrylate, iso-butyl methacrylate, t-butyl methacrylate, 2-ethylhexyl methacrylate, decyl methacrylate, methyl ethacrylate, ethyl ethacrylate, n-butyl ethacrylate, iso-butyl ethacrylate, t-butyl ethacrylate, 2-ethylhexyl ethacrylate, decyl ethacrylate, 2,3-dihydroxypropyl acrylate, 2,3-dihydroxypropyl methacrylate, 2-hydroxyethyl acrylate, 2-hydroxypropyl acrylate, hydroxypropyl methacrylate, glyceryl monoacrylate, glyceryl monoethacrylate, glycidyl methacrylate, glycidyl acrylate, acrylamide, methacrylamide, ethacrylamide, N-methyl acrylamide, N,N-dimethyl acrylamide, N,N-dimethyl methacrylamide, N-ethyl acrylamide, N-isopropyl acrylamide, N-butyl acrylamide, N-t-butyl acrylamide, N,N-di-n-butyl acrylamide, N,N-diethylacrylamide, N-octyl acrylamide, N-octadecyl acrylamide, N,N-diethylacrylamide, N-phenyl acrylamide, N-methyl methacrylamide, N-ethyl methacrylamide, N-dodecyl methacrylamide, N,N-dimethylaminoethyl acrylamide, quaternised N,N-dimethylaminoethyl acrylamide, N,N-dimethylaminoethyl methacrylamide, quaternised N,N-dimethylaminoethyl methacrylamide, N,N-dimethylaminoethyl acrylate, N,N-dimethylaminoethyl methacrylate, quaternised N,N-dimethyl-aminoethyl acrylate, quaternised N,N-dimethylaminoethyl methacrylate, 2-hydroxyethyl acrylate, 2-hydroxyethyl methacrylate, 2-hydroxyethyl ethacrylate, glyceryl acrylate, 2-methoxyethyl acrylate, 2-methoxyethyl methacrylate, 2-methoxyethyl ethacrylate, 2-ethoxyethyl acrylate, 2-ethoxyethyl methacrylate, 2-ethoxyethyl ethacrylate, maleic acid, maleic anhydride and its half esters, fumaric acid, itaconic acid, itaconic anhydride and its half esters, crotonic acid, angelic acid, diallyidimethyl ammonium chloride, vinyl pyrrolidone, vinylimidazole, methyl vinyl ether, methyl vinyl ketone, maleimide, vinyl pyridine, vinyl furan, styrene sulphonate, allyl alcohol, allyl citrate, allyl tartrate, vinyl acetate, vinyl alcohol, vinyl caprolactam and mixtures thereof.

It is particularly preferred that the A groups are polyacrylate blocks or polymethacrylate blocks.

Therefore, more preferred monomers are those selected from methyl acrylate, methyl methacrylate, methyl ethacrylate, ethyl acrylate, ethyl methacrylate, ethyl ethacrylate, n-butyl acrylate, n-butyl methacrylate, n-butyl ethacrylate, 2-ethylhexyl acrylate, 2-ethylhexyl methacrylate, 2-ethylhexyl ethacrylate, N-octyl acrylamide, 2-methoxyethyl acrylate, 2-hydroxyethyl acrylate, N,N-dimethylaminoethyl acrylate, N,N-dimethylaminoethyl methacrylate, acrylic acid, methacrylic acid, 2-hydroxyethyl acrylate, 2-hydroxyethyl methacrylate and mixtures thereof.

Most preferred monomers are those selected from N,N-dimethylaminoethyl acrylate, N,N-dimethylaminoethyl methacrylate, 2-ethylhexyl acrylate, hydroxyethyl methacrylate, N-octyl acrylamide, 2-hydroxyethyl acrylate, 2-hydroxyethyl methacrylate and mixtures thereof.

In one preferred group of polymers, each group A is a polymeric block built up from an ethylenically unsaturated monomer containing an aliphatic or aromatic moiety which contains a nitrogen atom. Preferably, each group A is a polymeric block built up from one or more monomers selected from vinylformamide, vinylpyridines, vinylimidazoles and compounds of the general formula $$H_2C=C(R)-CO-R^1 \quad (I)$$

where R is a hydrogen atom or a methyl group; and $R^1$ is a group of formula $-O-(CHR^2)_n-NR^3R^4$ or $-NR^5R^6$ in which n is 1, 2 or 3, $R^2$ represents a hydrogen atom or a hydroxyl or alkyl group, $R^3$ and $R^4$ each independently represent a hydrogen atom or an optionally substituted alkyl group or $R^3$ and $R^4$ together with the interjacent nitrogen atom represent a heterocyclic group, and $R^5$ and $R^6$ each independently represent a hydrogen atom or an optionally substituted alkyl group or $R^5$ and $R^6$ together with the interjacent nitrogen atom represent a heterocyclic group. Monomers of formula I are especially preferred.

It is preferred that $R^1$ is is a group of formula $-O-(CHR^2)_n-NR^3R^4$ in which n is 2 or 3, $R^2$ represents a hydrogen atom or a hydroxyl group, and $R^3$ and $R^4$ each independently represent a hydrogen atom or a $C_1$ alkyl group or $R^3$ and $R^4$ together with the intedacent nitrogen atom represent a morpholine or piperazine group.

More preferably, the monomer of formula I is selected from 2-(t-butylamino)ethyl methacrylate, 2-(dimethylamino)ethyl methacrylate, 2-(diethylamino)ethyl methacrylate, 2-(dimethylamino)ethyl acrylate, 2-(diethylamino) ethyl acrylate, 2-morpholineethyl methacrylate, 2-hydroxy-3-morpholinepropyl methacrylate, 2-piperazineethyl methacrylate and 2-hydroxy-3-piperazinepropyl methacrylate.

Even more preferably, the A groups are poly(aminoalkyl methacrylate) blocks, such as, for example, poly(2-(dimethylamino)ethyl methacrylate) blocks.

In an alternative preferred embodiment, $R^1$ is a group of formula $-NR^5R^6$ in which $R^5$ and $R^6$ each independently represent a hydrogen atom or a $C_{1-4}$ alkyl group optionally substituted by an amino, $C_{1-4}$ alkylamino, di-($C_{1-4}$ alkyl) amino group or a 5-to 6-membered heterocyclic group containing at least one nitrogen atom optionally substituted by an oxo group or a $C_{1-4}$ alkyl group.

More preferably, the monomer of formula I is selected from N,N-dimethylacrylamide, N-(t-butyl)acrylamide, N-[3-(dimethylamino)propyl]acrylamide, N-[3-(dimethylamino)propyl]methacrylamide and N-[2-(2-oxo-1-imidazolidinyl)ethyl]methacrylamide.

The B Block

Each group B is a polymeric block built up from an alkylene oxide, alkylene glycol or cyclic ether monomer or a mixture thereof.

Preferably, the B block of the invention is a poly(alkylene glycol) block. The term poly(alkylene glycol), as used herein, includes polymeric groups obtainable by the polycondensation of alkylene glycols, as well as polymeric groups obtainable by the polymerisation of an alkylene oxide or a cyclic ether (such as tetrahydrofuran). Thus, the B block may have zero, one, two or more oxygen atoms at the end of its chain or its chains. Preferably, the B block in the ABA block copolymers of the invention is a poly (alkylene glycol) block.

The poly(alkylene glycol) block of the B block may be obtainable from a single alkylene glycol, alkylene oxide or cyclic ether or a mixture of two or more different alkylene glycols, alkylene oxides or cyclic ethers. The poly(alkylene glycol) block, when not bound in the ABA block copolymers of the invention, may have zero, one, two or a plurality of hydroxyl groups at the ends of its chain or, when the B block is not linear, its chains. Although the poly(alkylene glycol) block may contain other than alkyleneoxy groups, it preferably comprises at least 75%, more preferably at least 90%, most preferably at least 99% by weight of the B block of alkyleneoxy groups.

Suitable alkyleneoxy groups in the B block include groups of formula $-R^{10}-O-$, wherein $R^{10}$ is a straight chain or branched aliphatic, saturated or unsaturated, $C_2$ to $C_{12}$ alkylene group or an alicyclic, saturated or unsaturated $C_3$ to $C_{12}$ cycloalkylene group. Preferably, $R^{10}$ is a straight chain or branched saturated aliphatic $C_2$ to $C_6$ group, more preferably a $C_2$ to $C_4$ group. Thus, each group B may be a poly ($C_{2-4}$ alkylene oxide). For example, the B group may comprise repeating units selected from ethyleneoxy, propyleneoxy, butyleneoxy and mixtures thereof. 1,2-alkyleneoxy units are preferred. However, in the case of higher alkylene oxides, arrangements other than 1,2- are possible. For instance, poly(tetrahydrofuran) is a poly (1,4-butylene oxide). Most preferably, the B group is a poly(ethylene glycol).

The B group may be linear, branched or hyperbranched. Where the B group is branched or hyperbranched, it may comprise two or more A blocks, with each A block bonded to an end of a chain in the B block.

The B block may be derived from a single monomer or may comprise residues derived from two or more different monomers. When the B block is derived from two or more monomers, the B block may be a block copolymer or a random copolymer. For example, the B block may be a block copolymer comprising C-D-C blocks e.g., the B block may be a poly(ethylene glycol)-poly(propylene glycol)-poly(ethylene glycol) block copolymer. When the B block is a block copolymer of formula C-D-C, the ABA block copolymer of the invention has the formula A-C-D-C-A. Random terpolymers of three or more alkylene oxides could also be envisaged.

Random copolymers containing substantial proportions of a poly(alkylene oxide) but also containing a third monomer which is not necessarily an alkylene oxide are also possible, particularly those in which both end groups are an alkylene oxide. Examples of such materials are, for instance, isocyanate extended polyethylene glycols.

In the case where B is a block copolymer a number of architectures are feasible These may be linear B1B2B1 or B2B1B2 arrangements. Alternatively, they may be branched in either a random or stereoregular manner.

Examples of these types of block copolymers are the Pluronic surfactants available from BASF.

The B block may have a number of architectures including linear, branched with three, four or more branches. In cases where the number of branches are three or more these may be either random branches or regular branches arising from growth of the poly(alkylene oxide) from a polyfunctional initiator allowing a defined architecture. Examples of such polyfunctional initiators are polyhydroxylic materials such as glycerol, pentaerythritol, sorbitan. The branches could be dendritic.

A further possibility is the case where the B block of the present invention is a triblock copolymer with polyalkylene oxide end blocks and an inner block of a vinylic substance, e.g. styrene, or other polymer, e.g. polydimethylsiloxane.

In the case of random branches this can result from either multiple random branching points arising. Examples of this type are polymers or copolymers from the polymerization of poly(alkylene oxide) macromonomers such as poly(ethylene glycol) methacrylate.

Examples of suitable commercially available randomly multiple branched B blocks are the silicone polyethers, e.g. the Silwet series available from OSi and the Abil series available from Goldschmidt.

Preferably, the B group has a molecular weight of from 100 to 100 000, preferably 1000 to 50 000 and most preferably 1000 to 40 000 Daltons.

Process for Producing Block Copolymers

The polymers of the present invention may be formed by a number of different routes. However, the polymers are preferably formed according to the process of the invention. In a preferred embodiment, the process of the invention involves a reaction which comprises two key reaction steps:

First Reaction Step

The first reaction step involves forming a poly(alkylene glycol) macroinitiator by grafting a radical initiator onto a poly(alkylene glycol) via a nucleophilic displacement reaction between groups on the poly(alkylene glycol) and on the radical initiator, respectively.

Typically the poly(alkylene glycol) macroinitiator is formed by a nucleophilic displacement reaction between:

(i) a poly(alkylene glycol) which is end-capped with at least one group capable of nucleophilic attack via its O, N or S atom, and (ii) a radical initiator comprising: at least one —C(O)X group, in which X is a leaving group capable of substitution by the nucleophilic O, N or S atom of the end-capped poly(alkylene glycol)(i); and at least one organic halide group capable of generating a radical, preferably in the presence of a transition metal catalyst. The term halide means fluoride, chloride, bromide or iodide.

The poly(alkylene glycol)(i) may be linear, branched or hyperbranched, provided it is end-capped with at least one group as described above. By "end-capped" is meant that the capping group is at or near a terminal position of the poly(alkylene glycol). The poly(alkylene glycol) may be end-capped with suitable groups (e.g., hydroxyl) as a result of its synthesis or an additional reaction step may be required to end-cap the polymer chain.

The radical initiator (ii) comprises at least one —C(O)X group, in which X is a leaving group capable of substitution by the nucleophilic O, N or S atom of the polyethyleneglycol (i), and at least one organic halide group capable of generating a radical in the presence of a transition metal catalyst.

Examples of Preferred Radical Initiators have the formula:

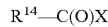

where $R^{14}$ is the organic halide group and X is the leaving group. Preferably, X is a halogen atom (i.e., F, Cl, Br or I). By "organic halide group" is meant any linear, branched or cyclic (aromatic or otherwise) carbon structure, whether substituted or unsubstituted, which also contains a halogen atom (i.e., F, Cl, Br or I).

Preferred radical initiators have the general formula:

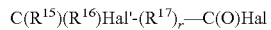

where Hal' and Hal independently denote halogen atoms (as defined above), $R^{15}$ and $R^{16}$ are independently selected from hydrogen or a monovalent, optionally substituted, linear or branched $C_{1-18}$ hydrocarbon radical as described above, r is an integer having a value of 0 or 1, and $R^{17}$ is selected from divalent, optionally substituted, linear or branched $C_1$–$C_{18}$ hydrocarbon radicals as described above.

A particularly preferred radical initiator corresponding to the above general formula has:

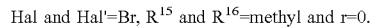

The first reaction step involves a nucleophilic displacement reaction between (i) and (ii) under conventional reaction conditions. The nucleophilic O, N or S atom of the poly(alkylene glycol) (i) replaces leaving group X of radical initiator (ii), thereby linking (i) and (ii) to generate a poly(alkylene glycol) macroinitiator.

Second Reaction Step

The second reaction step involves reacting the poly(alkylene glycol) macroinitiator obtained in step (i) with radically polymerisable monomers in the presence of a catalytic or stoichiometric amount of a Cu (I) salt or other transitional metal species and a ligand to form a poly(alkylene glycol) block copolymer.

In this reaction step, the organic halide groups act as initiators in the presence of the radically polymerisable monomers and the catalyst, resulting in the linking of a block of radically polymerisable monomers onto the poly (alkylene glycol) macroinitiator by atom transfer radical polymerisation. This block of radically polymerisable monomers constitutes the polymeric block (denoted A) of the poly(alkylene glycol) block copolymer of the invention.

The catalyst for the second reaction step is a transition metal salt, preferably a Cu(I) salt such as a Cu(I) halide salt (i.e., wherein the halide is Cl, F, Br or I) and which is preferably complexed to a ligand which is suitable for solubilising the Cu(I) salt in the reaction mixture. WO98/51261 describes preferred ligands for use in solubilising the Cu(I) salt in the reaction mixture (aprotic bidentates such as diphosphates, 2,2' bipyridyl, $C_1$–$C_{20}$ alkyl substituted bipyridyl and combinations thereof, most preferably 2,2' bipyridyl complexed to a Cu(I) halide salt, in particular CuCl). WO98151262 also refers to several journal articles which describe examples of the polymerisation process (atom transfer radical polymerisation) used in the second reaction step of the process of the present invention. Further examples of such descriptions can be found in Polymer Vol 39, No.21, pp 5163–5170 (Nakagawa et al) and Macromolecules 1997, 30, 2190–2193 (Haddleton et al). Those skilled in the art would understand that a variety of other ligands can also be employed.

The polymerisation process of the second reaction step can be furnished in bulk, solution, emulsion or suspension, as would be understood by those skilled in the art.

Radically polymerisable monomers suitable for use in the second reaction step of the process of the present invention are preferably ethylenically unsaturated monomers.

Polymers of the present invention can be prepared by any standard method utilised for the preparation of ABA block copolymers as described above which result in a normal polydispersity or molecular weight distribution. However, it is preferred that the polymers of the invention are synthesised using a method that gives low polydispersity of the polymer. Suitable methods include anionic polymerisation, atom transfer radical polymerisation (ATRP) as described above, RAFT or Madix polymerisation (which also proceeds via a macroinitiator) and $Ce^{4+}$ redox initiated polymerisation. Preferably, the polydispersity of the overall polymer is in the range of from 1.1 to 4.0, preferably from 1.1 to 1.6.

Compositions

The polymers of the present invention may be incorporated into compositions as described herein, containing only a diluent (which may comprise solid and/or liquid) and/or also comprising an active ingredient.

The polymers which may be used in laundry compositions include the polymers as defined previously but excluding vinylpyridine residues or including vinylpyridine residues with an anionic surfactant.

The polymer is typically included in said compositions at levels of from 0.01% to 25% by weight, preferably from 0.05% to 15%, more preferably from 0.1% to 10%, especially from 0.1% to 5% and most preferably from 0.5% to 3%, of the total composition.

The active ingredient in the compositions is preferably a surface active agent or a fabric conditioning agent. More than one active ingredient may be included. For some applications a mixture of active ingredients may be used.

The compositions of the invention may be in any physical form e.g. a solid such as a powder or granules, a tablet, a solid bar, a paste, gel or liquid, especially, an aqueous based liquid. In particular the compositions may be used in laundry compositions, especially in liquid, powder or tablet laundry composition.

The compositions of the present invention are preferably laundry compositions, especially main wash (fabric washing) compositions or rinse-added softening compositions. The main wash compositions may include a fabric softening agent and rinse-added fabric softening compositions may include surface-active compounds, particularly non-ionic surface-active compounds, if appropriate.

The detergent compositions of the invention may contain a surface-active compound (surfactant) which may be chosen from soap and non-soap anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and non-ionic compounds.

The compositions of the invention may contain linear alkylbenzene sulphonate, particularly linear alkylbenzene sulphonates having an alkyl chain length of $C_8$–$C_{15}$. It is preferred if the level of linear alkylbenzene sulphonate is from 0 wt % to 30 wt %, more preferably 1 wt % to 25 wt %, most preferably from 2 wt % to 15 wt %.

The compositions of the invention may contain other anionic surfactants in amounts additional to the percentages quoted above. Suitable anionic surfactants are well-known to those skilled in the art. Examples include primary and secondary alkyl sulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

The compositions of the invention may also contain non-ionic surfactant. Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

It is preferred if the level of non-ionic surfactant is from 0 wt % to 30 wt %, preferably from 1 wt % to 25 wt %, most preferably from 2 wt % to 15 wt %.

Any conventional fabric conditioning agent may be used in the compositions of the present invention. The conditioning agents may be cationic or non-ionic. If the fabric conditioning compound is to be employed in a main wash detergent composition the compound will typically be non-ionic. For use in the rinse phase, typically they will be cationic. They may for example be used in amounts from 0.5% to 35%, preferably from 1% to 30% more preferably from 3% to 25% by weight of the composition.

Preferably the fabric conditioning agent(s) have two long chain alkyl or alkenyl chains each having an average chain length greater than or equal to $C_{16}$. Most preferably at least 50% of the long chain alkyl or alkenyl groups have a chain length of $C_{18}$ or above. It is preferred if the long chain alkyl or alkenyl groups of the fabric conditioning agents are predominantly linear.

The fabric conditioning agents are preferably compounds that provide excellent softening, and are characterised by a chain melting L$\beta$ to L$\alpha$ transition temperature greater than 25° C., preferably greater than 35° C., most preferably greater than 45° C. This L$\beta$ to L$\alpha$ transition can be measured by DSC as defined in "Handbook of Lipid Bilayers, D Marsh, CRC Press, Boca Raton, Fla., 1990 (pages 137 and 337).

Substantially insoluble fabric conditioning compounds in the context of this invention are defined as fabric conditioning compounds having a solubility less than $1 \times 10^{-3}$ wt % in demineralised water at 20° C. Preferably the fabric softening compounds have a solubility less than $1 \times 10^{-4}$ wt %, most preferably less than $1 \times 10^{-8}$ to $1 \times 10^{-6}$. Preferred cationic fabric softening agents comprise a substantially water insoluble quaternary ammonium material comprising a single alkyl or alkenyl long chain having an average chain length greater than or equal to $C_{20}$ or, more preferably, a compound comprising a polar head group and two alkyl or alkenyl chains having an average chain length greater than or equal to $C_{14}$.

Preferably, the cationic fabric softening agent is a quaternary ammonium material or a quaternary ammonium material containing at least one ester group. The quaternary ammonium compounds containing at least one ester group are referred to herein as ester-linked quaternary ammonium compounds.

As used in the context of the quarternary ammonium cationic fabric softening agents, the term 'ester group', includes an ester group which is a linking group in the molecule.

It is preferred for the ester-linked quaternary ammonium compounds to contain two or more ester groups. In both monoester and the diester quaternary ammonium compounds it is preferred if the ester group(s) is a linking group between the nitrogen atom and an alkyl group. The ester groups(s) are preferably attached to the nitrogen atom via another hydrocarbyl group.

Also preferred are quaternary ammonium compounds containing at least one ester group, preferably two, wherein at least one higher molecular weight group containing at least one ester group and two or three lower molecular weight groups are linked to a common nitrogen atom to produce a cation and wherein the electrically balancing anion is a halide, acetate or lower alkosulphate ion, such as chloride or methosulphate. The higher molecular weight substituent on the nitrogen is preferably a higher alkyl group, containing 12 to 28, preferably 12 to 22, e.g. 12 to 20 carbon atoms, such as coco-alkyl, tallowalkyl, hydrogenated tallowalkyl or substituted higher alkyl, and the lower molecular weight substituents are preferably lower alkyl of 1 to 4 carbon atoms, such as methyl or ethyl, or substituted lower alkyl. One or more of the said lower molecular weight substituents may include an aryl moiety or may be replaced by an aryl, such as benzyl, phenyl or other suitable substituents.

Preferably the quaternary ammonium material is a compound having two $C_{12}$–$C_{22}$ alkyl or alkenyl groups connected to a quaternary ammonium head group via at least one ester link, preferably two ester links or a compound comprising a single long chain with an average chain length equal to or greater than $C_{20}$.

More preferably, the quaternary ammonium material comprises a compound having two long chain alkyl or alkenyl chains with an average chain length equal to or greater than $C_{14}$. Even more preferably each chain has an average chain length equal to or greater than $C_{16}$. Most preferably at least 50% of each long chain alkyl or alkenyl group has a chain length of $C_{18}$. It is preferred if the long chain alkyl or alkenyl groups are predominantly linear.

The most preferred type of ester-linked quaternary ammonium material that can be used in laundry rinse compositions according to the invention is represented by the formula (A):

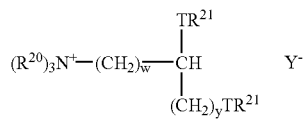

(A)

wherein T is

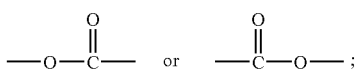

each $R^{20}$ group is independently selected from $C_{1-4}$ alkyl, hydroxyalkyl or $C_{2-4}$ alkenyl groups; and wherein each $R^{21}$ group is independently selected from $C_{8-28}$ alkyl or alkenyl groups; $Y^-$ is any suitable counterion, i.e. a halide, acetate or lower alkosulphate ion, such as chloride or methosulphate; w is an integer from 1–5 or is 0; and y is an integer from 1–5.

It is especially preferred that each $R^{20}$ group is methyl and w is 1 or 2.

It is advantageous for environmental reasons if the quaternary ammonium material is biologically degradable.

Preferred materials of this class such as 1,2 bis[hardened tallowoyloxy]-3-trimethylammonium propane chloride and their method of preparation are, for example, described in U.S. Pat. No. 4,137,180. Preferably these materials comprise small amounts of the corresponding monoester as described in U.S. Pat. No. 4,137,180 for example 1-hardened tallowoyloxy-2-hydroxy-3-trimethylammonium propane chloride.

Another class of preferred ester-linked quaternary ammonium materials for use in laundry rinse compositions according to the invention can be represented by the formula:

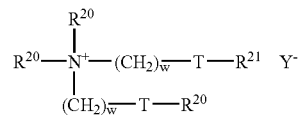

(B)

wherein T is

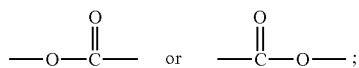

and
wherein $R^{20}$, $R^{21}$, w, and $Y^-$ are as defined above.

Of the compounds of formula (B), di-(tallowyloxyethyl)-dimethyl ammonium chloride, available from Hoechst, is the most preferred. Di-(hardened tallowyloxyethyl)dimethyl ammonium chloride, ex Hoechst and di-(tallowyloxyethyl)-methyl hydroxyethyl methosulphate are also preferred.

Another preferred class of quaternary ammonium cationic fabric softening agent is defined by formula (C):

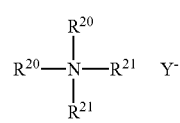

(C)

where $R^{20}$, $R^{21}$ and $Y^-$ are as hereinbefore defined.

A preferred material of formula (C) is di-hardened tallow-diethyl ammonium chloride, sold under the Trademark Arquad 2HT.

The optionally ester-linked quaternary ammonium material may contain optional additional components, as known in the art, in particular, low molecular weight solvents, for instance isopropanol and/or ethanol, and co-actives such as nonionic softeners, for example fatty acid or sorbitan esters.

The compositions of the invention, when used as main wash fabric washing compositions, will generally also contain one or more detergency builders. The total amount of detergency builder in the compositions will typically range from 5 to 80 wt %, preferably from 10 to 60 wt %.

It is also possible to include certain mono-alkyl cationic surfactants which can be used in main-wash compositions for fabrics. Cationic surfactants that may be used include quaternary ammonium salts of the general formula $R_1R_2R_3R_4N^+X^-$ wherein the R groups are long or short hydrocarbon chains, typically alkyl, hydroxyalkyl or ethoxylated alkyl groups, and X is a counter-ion (for example, compounds in which $R_1$ is a $C_8$–$C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters).

The choice of surface-active compound (surfactant), and the amount present, will depend on the intended use of the detergent composition. In fabric washing compositions, different surfactant systems may be chosen, as is well known to the skilled formulator, for handwashing products and for products intended for use in different types of washing machine.

The total amount of surfactant present will also depend on the intended end use and may be as high as 60 wt %, for example, in a composition for washing fabrics by hand. In compositions for machine washing of fabrics, an amount of from 5 to 40 wt % is generally appropriate. Typically the compositions will comprise at least 2 wt % surfactant e.g. 2–60%, preferably 15–40% most preferably 25–35%.

Detergent compositions suitable for use in most automatic fabric washing machines generally contain anionic non-soap surfactant, or non-ionic surfactant, or combinations of the two in any suitable ratio, optionally together with soap.

The compositions of the invention, when used as main wash fabric washing compositions, will generally also contain one or more detergency builders. The total amount of detergency builder in the compositions will typically range from 5 to 80 wt %, preferably from 10 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate are also suitable for use with this invention.

The compositions of the invention preferably contain an alkali metal, preferably sodium, aluminosilicate builder. Sodium aluminosilicates may generally be incorporated in amounts of from 10 to 70% by weight (anhydrous basis), preferably from 25 to 50 wt %.

The alkali metal aluminosilicate may be either crystalline or amorphous or mixtures thereof, having the general formula: $0.8–1.5\ Na_2O.\ Al_2O_3.\ 0.8–6\ SiO_2$ These materials contain some bound water and are required to have a calcium ion exchange capacity of at least 50 mg CaO/g. The preferred sodium aluminosilicates contain 1.5–3.5 $SiO_2$ units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. However, according to a preferred embodiment of the invention, the zeolite builder incorporated in the compositions of the invention is maximum aluminium zeolite P (zeolite MAP) as described and claimed in EP 384 070A (Unilever). Zeolite MAP is defined as an alkali metal aluminosilicate of the zeolite P type having a silicon to aluminium ratio not exceeding 1.33, preferably within the range of from 0.90 to 1.33, and more preferably within the range of from 0.90 to 1.20.

Especially preferred is zeolite MAP having a silicon to aluminium ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di and trisuccinates, carboxymethyloxy succinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

Compositions according to the invention may also suitably contain a bleach system. Fabric washing compositions may desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

Especially preferred is sodium percarbonate having a protective coating against destabilisation by moisture. Sodium percarbonate having a protective coating comprising sodium metaborate and sodium silicate is disclosed in GB 2 123 044B (Kao).

The peroxy bleach compound is suitably present in an amount of from 0.1 to 35 wt %, preferably from 0.5 to 25 wt %. The peroxy bleach compound may be used in conjunction with a bleach activator (bleach precursor) to improve bleaching action at low wash temperatures. The bleach precursor is suitably present in an amount of from 0.1 to 8 wt %, preferably from 0.5 to 5 wt %.

Preferred bleach precursors are peroxycarboxylic acid precursors, more especially peracetic acid precursors and pernoanoic acid precursors. Especially preferred bleach precursors suitable for use in the present invention are N,N,N',N',-tetracetyl ethylenediamine (TAED) and sodium nonanoyloxybenzene sulphonate (SNOBS). The novel quaternary ammonium and phosphonium bleach precursors disclosed in U.S. Pat. No. 4,751,015 and U.S. Pat. No. 4,818,426 (Lever Brothers Company) and EP 402 971A (Unilever), and the cationic bleach precursors disclosed in EP 284 292A and EP 303 520A (Kao) are also of interest.

The bleach system can be either supplemented with or replaced by a peroxyacid, examples of such peracids can be found in U.S. Pat. No. 4,686,063 and U.S. Pat. No. 5,397,501 (Unilever). A preferred example is the imido peroxycarboxylic class of peracids described in EP A 325 288, EP A 349 940, DE 382 3172 and EP 325 289. A particularly preferred example is phthalimido peroxy caproic acid (PAP). Such peracids are suitably present at 0.1–12%, preferably 0.5–10%.

A bleach stabiliser (transition metal sequestrant) may also be present. Suitable bleach stabilisers include ethylenediamine tetra-acetate (EDTA), the polyphosphonates such as Dequest (Trade Mark) and non-phosphate stabilisers such as EDDS (ethylene diamine di-succinic acid). These bleach stabilisers are also useful for stain removal especially in products containing low levels of bleaching species or no bleaching species.

An especially preferred bleach system comprises a peroxy bleach compound (preferably sodium percarbonate optionally together with a bleach activator), and a transition metal bleach catalyst as described and claimed in EP 458 397A, EP 458 398A and EP 509 787A (Unilever).

The compositions according to the invention may also contain one or more enzyme(s). Suitable enzymes include the proteases, amylases, cellulases, oxidases, peroxidases and lipases usable for incorporation in detergent compositions. Preferred proteolytic enzymes (proteases) are, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available and can be used in the instant invention. Examples of suitable proteolytic enzymes are the subtilins which are obtained from particular strains of *B. Subtilis B. licheniformis*, such as the commercially available subtilisins Maxatase™, as supplied by Gist Brocades N.V., Delft, Holland and Alcalase™, as supplied by Novo Industri A/S, Copenhagen, Denmark.

Particularly suitable is a protease obtained from a strain of *Bacillus* having maximum activity throughout the pH range 8–12, being commercially available, e.g. from Novo Industri A/S under the registered trade-names Esperase™ and Savinase™. The preparation of these and analogous enzymes is described in GB 1 243 785. Other commercial proteases are Kazusase (Trade Mark obtainable from Showa-Denko of Japan), Optimase (Trade Mark from Miles Kali-Chemie, Hannover, West Germany), and Superast (Trade Mark obtainable from Pfizer of U.S.A.).

Detergency enzymes are commonly employed in grandular form in amounts of from about 0.1 to about 3.0 wt %. However, any suitable phusical form of enzyme may be used.

The compositions of the invention may contain alkali metal, preferably sodium carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate copolymer, or sodium silicate. One preferred powder structurant is fatty acid soap, suitably present in an amount of from 1 to 5 wt %.

Other materials that may be present in detergent compositions of the invention include sodium silicate; antiredeposition agents such as cellulosic polymers; soil release polymers; inorganic salts such as sodium sulphate; lather control agents or lather boosters as appropriate; proteolytic and lipolytic enzymes; dyes; coloured speckles; perfumes; foam controllers; fluorescers and decoupling polymers. This list is not intended to be exhaustive. However, many of these ingredients will be better delivered as benefit agent groups in materials according to the first aspect of the invention.

The detergent composition when diluted in the wash liquor (during a typical wash cycle) will typically give a pH of the wash liquor from 7 to 10.5 for a main wash detergent.

Particulate detergent compositions are suitably prepared by spray-drying a slurry of compatible heat-insensitive ingredients, and then spraying on or post-dosing those ingredients unsuitable for processing via the slurry. The skilled detergent formulator will have no difficulty in deciding which ingredients should be included in the slurry and which should not.

Particulate detergent compositions of the invention preferably have a bulk density of at least 400 g/1 liter, more preferably at least 500 g/litre. Especially preferred compositions have bulk densities of at least 650 g/liter, more preferably at least 700 g/liter.

Such powders may be prepared either by post-tower densification of spray-dried powder, or by wholly non-tower methods such as dry mixing and granulation; in both cases a high-speed mixer/granulator may advantageously be used. Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form which means it will contain a lower level of water compared to a conventional liquid detergent.

Substrate

The substrate may be any substrate onto which it is desirable to deposit a polymer and which is subjected to treatment such as a washing or rinsing process.

In particular, the substrate may be a textile fabric, fabric, preferably of cotton.

It has been found that particular good results are achieved when using a natural fabric substrate such as cotton, or fabric blends containing cotton.

Treatment

The treatment of the substrate with the material of the invention can be made by any suitable method such as washing, soaking or rinsing of the substrate.

Typically the treatment will involve a washing or rinsing method such as treatment in the main wash or rinse cycle of a washing machine and involves contacting the substrate with an aqueous medium comprising the material of the invention.

The present invention will now be explained in more detail by reference to the following non-limiting examples.

EXAMPLES

Examples 1 to 5

ABA Triblock Copolymers of the Following General Formula:

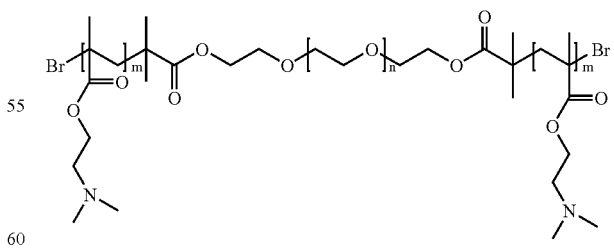

in which m and n are positive integers were prepared by atom transfer radical polymerisation (ATRP). Commercially available poly(ethylene glycol)s were halide functionalised to give an effective ATRP initiator. Controlled molecular weights were achieved with narrow polydispersities.

Experimental procedures for the Preparation of PDMAEMA-PEG-PDMAEMA-Block Copolymers (A) Preparation of Poly(ethylene Glycol) (PEG) Macroinitiator Poly(ethylene glycol), MW=1000, ex Polysciences Inc. (20 g, 0.02 moles) was dissolved in anhydrous toluene (100 ml) in a 2-necked round bottom flask fitted with a suba seal and calcium chloride guard tube. 4-(Dimethylamino)pyridine (DMAP) (0.054 g, $4.4 \times 10^{-4}$ moles), triethylamine (TEA) (4.45 g, 0.044 moles) and a magnetic stirrer bar were added to the PEG solution. 2-Bromoisobutyryl bromide (10.12 g, 0.044 moles) was added dropwise via a syringe through the suba seal, which caused the initially clear solution to turn to a milky suspension. After stirring at ambient overnight, the toluene was removed by evaporation using a rotary evaporator and the remaining brown liquid was dissolved in dichloromethane (200 ml). This solution was added to a separating funnel and washed successively with saturated sodium bicarbonate solution (100 ml), 1M hydrochloric acid (100 ml) and brine (100 ml). The dichloromethane layer was then dried over magnesium sulfate, filtered and the solvent evaporated. After drying overnight under vacuo the product was obtained as a brown oil (19.25 g, 73.1% yield).

Reaction scheme 1:

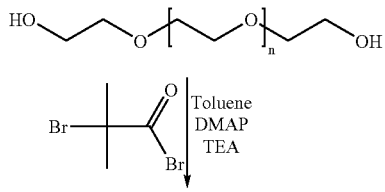

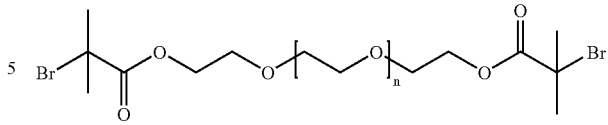

Characterisation:

IR: 1734 cm$^{-1}$ (s, saturated ester carbonyl) NMR ($^1$H-CDCl$_3$): 1.94 (d, ester CH$_3$, 12H); 3.64 (s, PEG CH$_2$, 80H); 3.73 (t, CH$_2$—O, 4H); 4.33 (t, CH$_2$—O, 4H).

(B) Preparation of PDMAEMA-PEG-PDMAEMA Block Copolymers (PDMAEMA=poly(2-(dimethylamino)ethyl Methacrylate))

2-(Dimethylamino)ethyl methacrylate (ex Aldrich) (15.41 g, 0.098 moles, the amount required to give a theoretical molecular weight of 5000) and the PEG-macroinitiator (2 g, $1.54 \times 10^{-3}$ moles) were dissolved in demineralised water (20 ml) and added to a 3-necked 50 ml round bottom flask fitted with a magnetic stirrer bar, a thermometer, a N$_2$ inlet and a suba seal fitted with a gas outlet. Dry N$_2$ gas was bubbled through the solution for 45 minutes. Copper(1)bromide (0.221 g, $1.54 \times 10^{-4}$ moles) and 2,2'-dipyridyl (0.4866, $3.08 \times 10^3$ moles) were weighed into a glass vial, mixed and added to the reaction mixture by lifting the thermometer from the flask's socket, replacing the thermometer immediately after addition of the solids. The reaction mixture turned to a green colour on mixing the solids into solution, also an increase in viscosity was noted. A reaction exotherm of 28° C. was recorded over a time period of 6 minutes. After mixing for 2 hours under a N$_2$ blanket, the contents of the flask was poured into a beaker and diluted with water (100 ml). This solution was then poured through a bed of silica to remove the copper metal, which resulted in the initially dark green solution becoming clear and almost water-white.

This aqueous solution was freeze-dried over the weekend yielding 15 g of slightly pink material.

Reaction scheme 2:

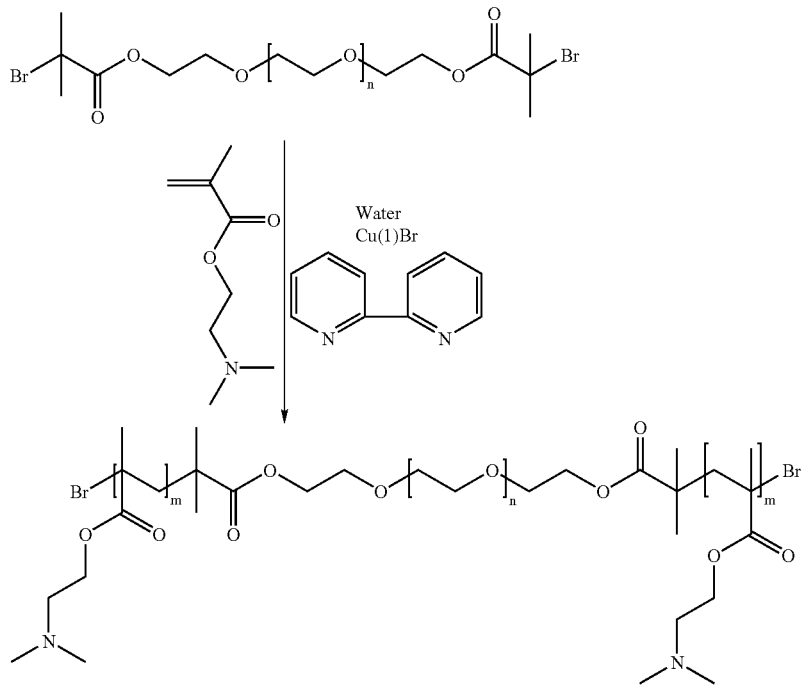

m and n are positive integers

Characterisation:

IR: 1723 cm$^{-1}$ (s, saturated ester carbonyl) NMR (1H-CDCl$_3$): 2.3 (m, N—CH$_3$, 6H); 2.6 (s, N—CH$_2$, 2H); 3.65(s, O—CH$_2$—CH$_2$—O, 4H); 5 4.08 (s, CH$_2$—O, 2H). GPC (eluent=THF; PMMA standards): Mn=9000; Mw=11900; Pdi=1.35

Similarly, the copolymers of Examples 2 to 5 with poly(ethylene glycol)s of different sizes were prepared.

Example 1—(PDMAEMA)-(PEG)-(PDMAEMA) [5 k PDMAEMA 1 k PEG; 5 k PDMAEMA]

Example 2—(PDMAEMA)-(PEG)-(PDMAEMA) [5 k PDMAEMA; 3.4 k PEG; 5 k PDMAEMA]

Example 3—(PDMAEMA)-(PEG)-(PDMAEMA) [5 k PDMAEMA; 7.5 k PEG; 5 k PDMAEMA]

Example 4—(PDMAEMA)-(PEG)-(PDMAEMA) [5 k PDMAEMA; 20 k PEG; 5 k PDMAEMA]

Example 5—(PDMAEMA)-PEG)-(PDMAEMA) [5 k PDMAEMA; 35 k PEG; 5 k PDMAEMA]

Example 6

Soil Release Evaluation

The polymers of Examples 1 to 5 were tested for detergency on cotton fabric using an apparatus for simultaneously contacting different liquids with different regions of a single sheet of fabric. This apparatus is described in detail in U.S. patent application Ser. No. 09/593,730, filed Jun. 13, 2000, which is incorporated herein by reference. Briefly, the fabric sheet was clamped between an upper and lower block. The fabric sheet was sandwiched between two rubber seals. Both blocks and seals contain an 8×12 array of square cavities, which are aligned. When blocks and fabrics are clamped together, liquids placed in individual wells do not leak or bleed through to other wells, due to the pressure applied by the blocks in the regions separating the wells. The liquids are forced to flow back and forth through the fabric by means of a pneumatically actuated thin rubber membrane, which is placed between the fabrics and the lower block. Repeated flexing of the membrane away from and towards the fabrics results in fluid motion through the fabrics.

A white fabric was washed in the above apparatus. 200 μL of each wash solution were placed in appropriate wells in the washing apparatus. The wash solutions contained OMO MA (commercially available in Brazil), OMO MA+polymer at 200 ppm. The liquids flowed through the fabrics for 20 minutes, at 30° C. with a flow cycle time of 1.5 seconds. After 20 minutes, the free liquid in the cells was poured off. The blocks where then separated and the fabric removed, and thoroughly rinsed for 1 minute in 200 ml demineralised water. The fabrics were allowed to dry for 24 hours.

The dry fabric was placed on top of a 96 well polypropylene microtitre plate. 5 μL of dirty motor oil (15% weight in Toluene) was dispensed from a pipette, onto the centre of each of the 96 cells on the cloth. This was repeated with a second fabric using 10 μL of yellow pottery clay (10% dispersion in demineralised water). The stained fabrics were allowed to dry at room temperature for 24 hours. The stain intensity was then measured using a flatbed scanner.

The test fabric was then re-clamped in the washing apparatus, 200 μL of each wash solution was placed in appropriate wells. The products were OMO MA (commercially available in Brazil), OMO MA+polymer at 50 PPM. The liquids flowed through the fabrics for 20 minutes, at 30° C. with a flow cycle time of 1.5 seconds. After 20 minutes, the free liquid in the cells was poured off. The blocks where then separated and the fabric removed, and thoroughly rinsed for 1 minute in 200 mL demineralised water. The fabrics were allowed to dry for 24 hours. The stain intensity was then measured using a flatbed scanner.

The experiment was carried out with product doses of 2 and 4 g/L. With water of 6 and 12°FH, made up of three parts Calcium to 1 part Magnesium. The after wash reflectance for the polymer control product was subtracted from the after wash reflectance of the polymer containing product.

The following table gives the units of benefit of polymer containing product over the control product at each condition as a function of PEG molecular weight.

| | DMO Soil Release | | | |
|---|---|---|---|---|
| PEG/K | 2 g/L 12 FH | 2 g/L 6 FH | 4 g/L 12 FH | 4 g/L 6 FH |
| 1 | 1.23 | 0.88 | 4.2 | 4.17 |
| 3.4 | 2.87 | 2.06 | 6.12 | 5.52 |
| 7.5 | 5.48 | 4.31 | 6.72 | 6.33 |
| 20 | 4.24 | 4.32 | 6.19 | 6.06 |
| 35 | 5.38 | 3.83 | 7.07 | 6.56 |

| | Clay Soil Release | | | |
|---|---|---|---|---|
| PEG/K | 2 g/L 12 FH | 2 g/L 6 FH | 4 g/L 12 FH | 4 g/L 6 FH |
| 1 | −0.72 | 0.34 | 0.35 | −0.96 |
| 3.4 | 0.5 | 0.79 | 0.18 | −0.24 |
| 7.5 | 0.38 | 0.17 | 1.26 | 0.4 |
| 20 | 0.55 | 0.95 | 0.97 | −0.23 |
| 35 | 0.54 | 1.03 | 0.82 | −0.25 |

Soil release is measured relative to a control cloth (not treated with polymer) and is expressed in units of ΔΔR. The control cloth is normalised to the ΔΔR value of zero. Test cloths giving soil release will have a positive ΔΔR value, test cloths not giving soil release will have a zero ΔΔR value, whereas test cloths giving a darker stain after polymer treatment and washing compared with a control will have a negative ΔΔR value. Benefits greater than 3 units of ΔΔR are perceivable to the consumer.

Example 7

Preparation of a PEG-PDMAEMA A-B Block Copolymer (A) Preparation of Poly(Ethylene Glycol) (PEG) Macroinitiator Monomethoxy poly(ethylene glycol), MW=5000, ex Aldrich (50 g, 0.01 moles) was dissolved in anhydrous toluene (250 ml) in a 2-necked round bottom flask fitted with a suba seal and calcium chloride guard tube. Polymer-bound 4-(dimethylamino)pyridine (2 g, 1.25 mmol N/g), triethylamine (2.02 g, 0.02 moles) and a magnetic stirrer bar were added to the PEG solution. 2-Bromoisobutyryl bromide (4.6 g, 0.02 moles) was added dropwise via a syringe through the suba seal, which caused the initially clear solution to turn to a milky suspension. After stirring at ambient temperature overnight, the reaction mixture was filtered through a bed of silica to remove insolubles. The filtrate was evaporated to about one third of its original volume, then added to petroleum ether and the precipitated product collected on a filter. After drying overnight under vacuo the product was obtained as a white solid.

Characterisation:

IR: 1734 cm$^{-1}$ (s, saturated ester carbonyl) NMR ($^1$H-CDCl$_3$) (ppm): 1.94 (d, ester CH$_3$); 3.38 (s, methoxy CH$_3$); 3.64 (s, PEG CH$_2$); 4.32 (m, CH$_2$—O—CO).

(B) Preparation of PEG-PDMAEMA A-B Block Copolymer (PDMAEMA=Poly(2-(dimethylamino)ethyl methacrylate))

2-(Dimethylamino)ethyl methacrylate (ex Aldrich) (1.55 g, 9.88 mmol, the amount required to give a theoretical molecular weight of 1000) and the PEG-macroinitiator (8 g, 1.553 mmol) were dissolved in demineralised water (35 ml) and added to a 3-necked 50 ml round bottom flask fitted with a magnetic stirrer bar, a thermometer, a N$_2$ inlet and a suba seal fitted with an gas outlet. Dry N$_2$ gas was bubbled through the solution for 45 minutes. Copper(I)bromide (0.22 g, 1.553 mmol) and 2,2'-dipyridyl (0.485 g, 3.11 mmol) were weighed into a glass vial, mixed and added to the reaction mixture by lifting the thermometer from the flask's socket, replacing the thermometer immediately after addition of the solids. The reaction mixture turned to a green colour on mixing the solids into solution, also an increase in viscosity was noted. A reaction exotherm of 25° C. was recorded over a time period of 5 minutes. After mixing for 2 hours under a N$_2$ blanket, the contents of the flask was poured into a beaker and diluted with water (100 ml). This solution was then poured through a bed of silica to remove the copper metal and the aqueous filtrate freeze-dried over the weekend yielding a white product.

Characterisation:

IR: 1723 cm$^{-1}$ (s, saturated ester carbonyl) NMR ($^1$H-CDCl$_3$) (ppm): 0.8–1.4 (methacrylate backbone CH$_3$); 1.7–2.1 (methacrylate backbone CH$_2$); 2.4 (m, N—CH$_3$, 6H); 2.7 (s, N—CH$_2$, 2H); 3.38 (s, methoxy CH$_3$, 3H); 3.65(s, O—CH$_2$—CH$_2$—O, 4H); 4.13 (s, CH$_2$—O, 2H).

| DMO Soil Release | | | |
|---|---|---|---|
| 1.3 g/L 12 FH | 1.3 g/L 6 FH | 4 g/L 12 FH | 4 g/L 6 FH |
| 3.1 | 2.1 | −0.05 | −0.34 |

| Clay Soil Release | | | |
|---|---|---|---|
| 1.3 g/L 12 FH | 1.3 g/L 6 FH | 4 g/L 12 FH | 4 g/L 6 FH |
| 2.1 | 1.82 | 1.61 | 1.2 |

We claim:

1. A method of promoting soil release during laundering of a textile fabric, the method comprising contacting the fabric with a polymer comprising a block copolymer containing at least one group A and at least one group B in which each group A is a polymeric block built up from an ethylenically unsaturated polymerisable monomer containing an aliphatic or aromatic moiety which contains a nitrogen atom and each group B is a polymeric block built up from poly(ethylene glycol) and subsequently washing the fabric after wear or use of the fabric.

2. The method of claim 1 wherein the block copolymer is an AB or ABA block copolymer.

3. The method of claim 1 wherein each group A is a polymeric block built up from one or more monomers selected from vinylformamide, vinylpyridines, vinylimidazoles and compounds of the general formula (i):

where R is a hydrogen atom or a methyl group; and
R$^1$ is a group of formula —O—(CHR$^2$)$_n$—NR$^3$R$^4$ or —NR$^5$R$^6$ in which n is 1, 2 or 3, R$^2$ represents a hydrogen atom or a hydroxyl or alkyl group, R$^3$ and R$^4$ each independently represent a hydrogen atom or an optionally substituted alkyl group or R$^3$ and R$^4$ together with the interjacent nitrogen atom represent a heterocyclic group, and R$^5$ and R$^6$ each independently represent a hydrogen atom or an optionally substituted alkyl group or R$^5$ and R$^6$ together with the interjacent nitrogen atom represent a heterocyclic group.

4. The method of claim 3 in which R$^1$ is a group of formula —O—(CHR$^2$)$_n$—NR$^3$R$^4$ in which n is 2 or 3, R$^2$ represents a hydrogen atom or a hydroxyl group, and R$^3$ and R$^4$ each independently represent a hydrogen atom or a C$_{1-6}$ alkyl group or R$^3$ and R$^4$ together with the interjacent nitrogen atom represent a morpholine or piperazine group.

5. The method of claim 3 in which the monomer of formula I is selected from 2-(t-butylamino)ethyl methacrylate, 2-(dimethylamino)ethyl methacrylate, 2-(diethylamino)ethyl methacrylate, 2-(dimethylamino)ethyl acrylate, 2-(diethylamino)ethyl acrylate, 2-morpholineethyl methacrylate, 2-hydroxy-3-morpholinepropyl methacrylate, 2-piperazineethyl methacrylate and 2-hydroxy-3-peperazinepropyl methacrylate.

6. The method of claim 5 in which each group A is poly(2-dimethylamino)ethyl methacrylate) block.

7. The method of claim 3 in which R$^1$ is a group of formula —NR$^6$R$^6$ in which R$^5$ and R$^6$ each independently represent a hydrogen atom or a C$_{1-6}$ alkyl group optionally substituted by an amino, C$_{1-4}$ alkylamino, di-(C$_{1-4}$ alkyl)amino group or a 5- to 6-membered heterocyclic group containing at least one nitrogen atom optionally substituted by an oxo group or a C$_{1-4}$ alkyl group.

8. The method of claim 3 in which the monomer of formula I is selected from N,N-dimethylacrylamide, N-(t-butyl)acrylamide, N-[3-(dimethylamino)propyl]-acrylamide, N-[3-(dimethylamino)propyl]methacrylamide and N-[2-(2-oxo-1-imidazolidinyl)ethyl]methacrylamide.

9. The method of claim 1 in which each group A has a molecular weight of 100 to 1 000 000.

10. The method of claim 1 in which each group B has a molecular weight of 100 to 100000.

11. The method of claim 1 in which the overall polymer has a polydispersity in the range of 1.1 to 4.0.

12. The method of claim 1 in which each group A has a molecular weight of 1000 to 100,000.

13. The method of claim 1 in which each group B has a molecular weight of 1000 to 50000.

14. The method of claim 1 in which each group B has a molecular weight of 1000 to 40000.

15. The method of claim 1 in which the overall polymer has a polydispersity in the range of 1.1 to 1.6.

* * * * *